UNITED STATES PATENT OFFICE.

IVAN LEVINSTEIN AND RICHARD HERZ, OF MANCHESTER, ENGLAND, ASSIGNORS TO THE LEVINSTEIN, LIMITED, OF SAME PLACE.

NAPHTHYLENE-DIAMIN-SULFONIC ACID AND PROCESS OF MAKING SAME.

SPECIFICATION forming part of Letters Patent No. 619,194, dated February 7, 1899.

Application filed June 14, 1897. Serial No. 640,753. (Specimens.)

*To all whom it may concern:*

Be it known that we, IVAN LEVINSTEIN, a subject of the Queen of Great Britain and Ireland, and RICHARD HERZ, a subject of the German Emperor, residing at Manchester, in the county of Lancaster, England, have invented certain new and useful Improvements in the Production of Alpha$_1$ Alpha$_2$ Naphthylenediamin-Beta$_1$ Sulfonic Acid, of which the following is a specification.

This invention has been patented in Great Britain, dated February 10, 1896, No. 2,946, and in France, dated June 2, 1896, No. 256,862.

The production of an alpha$_1$ alpha$_2$ naphthylenediamin sulfonic acid is described in the specification of Letters Patent of Great Britain No. 15,444, dated the 14th day of August, A. D. 1893. This acid is obtained by the nitration of the acetyl compound of alpha$_1$ naphthylamin beta$_3$ or beta$_4$ sulfonic acid and subsequent reduction and saponification. If treated with nitrous acid, it is decomposed and becomes incapable of reacting with amins or phenols. We have, however, discovered a new alpha$_1$ alpha$_2$ naphthylenediamin sulfonic acid which when treated with nitrous acid readily reacts with amins, diamins, their alkylated and phenylated compounds, with phenols, amindophenols, amidophenol ethers, and dioxy compounds, both of the benzene and naphthalene series, as well as their known carboxylic and sulfonic acids. In the new coloring-matters thus formed only one of the amido groups of the naphthylenediamin sulfonic acid enters into the reaction. The second amido group remains free. This second amido group may be further diazotized, and thus diazo-azo compounds may be produced which, combined with amins, diamins, their alkylated and phenylated compounds, with phenols, amidophenols, amidophenol ethers, dioxy compounds, both of the benzene and naphthalene series, as well as their known carboxyl and sulfonic acids, produce tetrazo colors, which dye shades from yellow to deep black and possess very valuable properties. These tetrazo colors may be employed either for developing the colors on the fiber or for the production of coloring-matters in substance.

The new alpha$_1$ alpha$_2$ naphthylenediamin sulfonic acid may be used not only for the production of azo and tetrazo coloring-matters, but also, like all paradiamins, may be employed in the manufacture of safranins, indulins, and similar colors.

For the production of our new alpha$_1$ alpha$_2$ naphthylenediamin monosulfonic acid we may proceed, by way of example, as follows: 9.3 kilos of anilin are diazotized in the usual well-known manner, and the diazobenzene thus obtained is combined, while stirring, with 24.5 kilos of the sodium salt of alpha$_1$ naphthylamin beta$_1$-mono-sulfonic acid dissolved in about five hundred liters of water. The temperature is preferably not allowed to exceed 15° centigrade. Stirring is continued for a few hours, when the formation of the coloring-matter is complete. The produced coloring-matter, which is in the form of a precipitate, is then filtered off and pressed. The thus-produced pressed cake is added to a boiling mixture of thirty kilos of iron borings, two hundred liters of water, and two kilos of ordinary commercial hydrochloric acid. When the reduction is finished, the mass is made slightly alkaline by means of sodium carbonate or other suitable alkali, and the free anilin is recovered by steam in the well-understood manner. The remaining solution, which contains the sodium salt of the new naphthylenediamin sulfonic acid, is then separated from the iron by filtration or otherwise. The filtrate is now acidified, when the new naphthylenediamin sulfonic acid crystallizes out in fine needles having a slight red coloration.

This new acid is almost insoluble in cold water, more easily soluble in hot water, and almost insoluble in alcohol. A very characteristic property of it is the readiness with which it is oxidized in a neutral or, still more, in an alkaline solution even by the oxygen of the air. The product of oxidation is a yellow crystalline substance, which in an aqueous solution shows a magnificent greenish-yellow fluorescence resembling that of fluorescein.

We do not confine ourselves to the above example, as in the first step—that is to say, in the formation of the azo color—we may use other suitable diazo bodies in place of the diazobenzene—such, for example, as the diazo compounds of toluidin, xylidin, and alpha-naphthylamin or their sulfonic acids. We, however, usually give preference to the use of anilin, as described. In the second step also we do not confine ourselves to the specified method of reduction, as other well-known means may be employed. So far we have found the described method of reduction to be economical and effective.

Having now particularly described and ascertained the nature of our said invention and in what manner the same may be performed, we declare that what we claim is—

1. The process for the production of the $alpha_1$ $alpha_2$ naphthylenediamin $beta_1$ sulfonic acid which consists in reducing the azo coloring-matters obtained by the combination of diazo bodies, with $alpha_1$ naphthylamin $beta_1$ sulfonic acid, substantially as described.

2. As a new article of manufacture, the new $alpha_1$ $alpha_2$ naphthylenediamin $beta_1$ sulfonic acid produced by the reduction of azo coloring-matters obtained by the combination of diazo bodies with $alpha_1$ naphthylamin $beta_1$ sulfonic acid, which new acid has the formula:

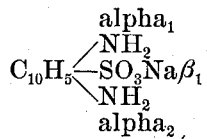

is nearly insoluble in cold water, barely soluble in hot water, insoluble in alcohol, soluble in concentrated $H_2SO_4$, and which forms a sodium salt easily soluble in water and having the characteristic property that it is oxidized in a neutral and more easily in an alkaline solution by the oxygen of the air to a yellowish crystalline substance the aqueous solution of which shows a magnificent greenish-yellow fluorescence resembling that of fluorescein.

IVAN LEVINSTEIN.
RICHARD HERZ.

In presence of—
WILLIAM E. WEYS,
ARTHUR MILLWARD.